Jan. 8, 1929.  1,698,168
W. B. PARSELS
INCLOSURE AND ROLLER FOR HEARSES
Filed Feb. 21, 1928
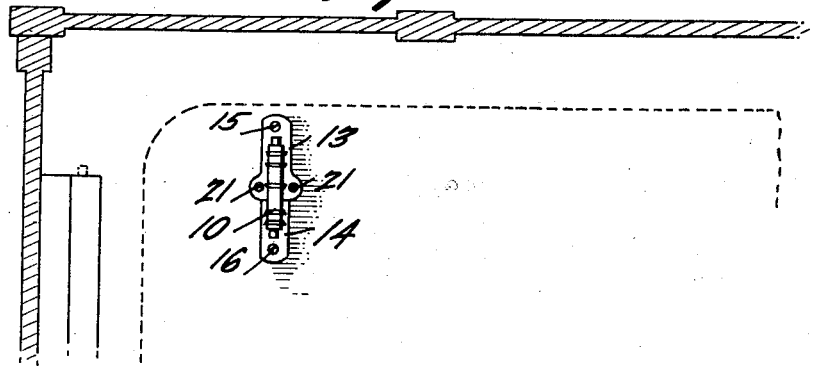
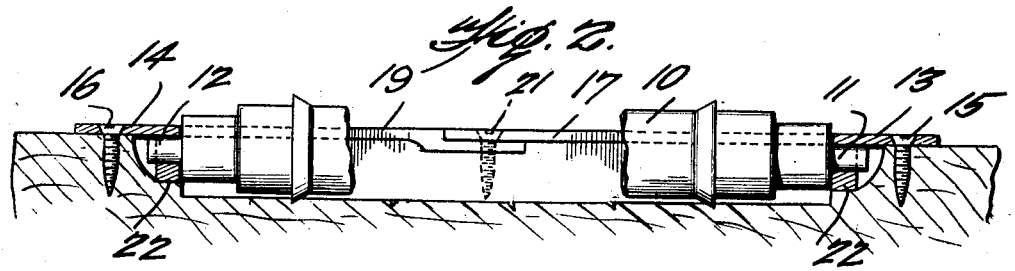
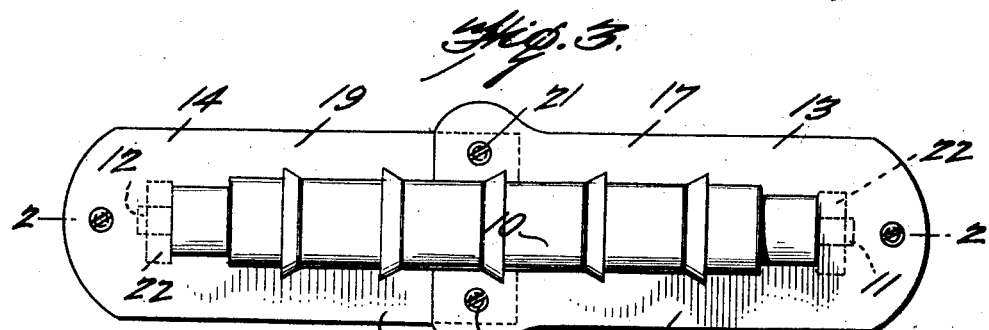
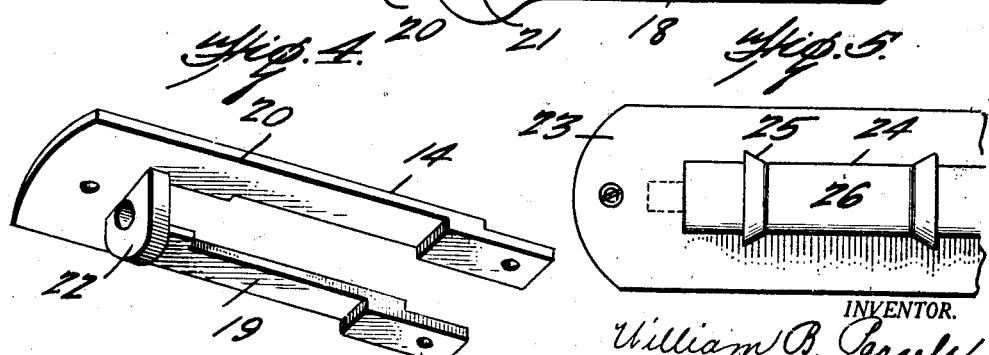
INVENTOR.
William B. Parsels,
BY
ATTORNEY.

Patented Jan. 8, 1929.

1,698,168

UNITED STATES PATENT OFFICE.

WILLIAM B. PARSELS, OF PLEASANTVILLE, NEW JERSEY.

INCLOSURE AND ROLLER FOR HEARSES.

Application filed February 21, 1928. Serial No. 256,010.

This invention relates to rollers for hearses and mountings or bearings for rotatably holding the rollers on the floor of a hearse.

It is an object of this invention to produce a bearing bracket or plate which is an improvement on those shown in my patents issued to me on December 8, 1925 and July 26, 1927 and numbered 1,565,195 and 1,637,239 respectively, and the present invention has advantages which include the expeditious assembly of the roller and its mounting, and the said mounting permits of the manufacture of the roller with its trunnion as an integral part thereof and it results in a more satisfactory and efficient unit.

It is a further object of this invention to produce a roller having trunnions, associated with a two-part mounting, each of which has a bearing for a trunnion of the roller, the said parts of the mounting being secured together with the roller mounted therein at the time the roller is installed in the hearse.

It is an object furthermore to provide a device of this character which is comparatively inexpensive to manufacture and install.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of a fragment of a hearse floor, showing a device embodying the invention applied thereto;

Figure 2 illustrates an enlarged sectional view of the mounting with a roller applied thereto;

Figure 3 illustrates an enlarged detail view of the roller and its mounting; and Figure 4 illustrates a perspective view of one end of the mounting.

In the present embodiment of the invention, a roller 10 is preferably provided with integral trunnions 11 and 12 and this facilitates the production of rollers, as compared with rollers that are bored for the reception of shafts or trunnions and in which the shafts or trunnions are installed as a separate element.

The mounting for the trunnions of the rollers, in the present embodiment of the invention, comprises two plates 13 and 14, each of which is independently anchored to the floor of a hearse by fastenings 15 and 16, respectively, such as screws or the like.

It is seen that the plate 13 has parallel portions 17 and 18, and that the plate 14 has parallel portions 19 and 20, and that the portions 17 and 18 overlie the portions 19 and 20 at their junctions. The overlapping portions are secured together and to the floor of a hearse by similar fastenings 21, such as screws or the like, and it is furthermore seen that the ends of the portions 19 and 20 are stepped in order that the upper surfaces of the portions 17 and 18 are on a plane with the upper surfaces of the portions 19 and 20. Each plate has a depending lug 22 apertured for the reception of a trunnion of the roller, and these lugs constitute bearings in which the trunnions rotate.

While the rollers have been illustrated as having the construction of those of the patents referred to, it is to be understood that the mounting can also be employed with plain rollers.

I claim:

1. In a roller for caskets in hearses, a roller having integral trunnions, a mounting therefor comprising plates having overlapping ends, means for securing the plates together and to a hearse floor, and bearings depending from the plates in which the trunnions of the roller are rotatable.

2. In a roller for caskets in hearses, a roller having trunnions, a mounting therefor comprising plates, each having parallel portions overlapping each other near the center of the roller, and depending bearings on the plates for receiving the trunnions of the roller.

WILLIAM B. PARSELS.